United States Patent
Tanaka et al.

(10) Patent No.: US 9,023,521 B2
(45) Date of Patent: May 5, 2015

(54) NONAQUEOUS ELECTROLYTE SECONDARY BATTERY

(75) Inventors: Tadayoshi Tanaka, Takatsuki (JP); Mai Yokoi, Kobe (JP); Hiroshi Minami, Kobe (JP); Naoki Imachi, Kobe (JP)

(73) Assignee: SANYO Electric Co., Ltd., Daito-shi (JP)

( * ) Notice: Subject to any disclaimer, the term of this patent is extended or adjusted under 35 U.S.C. 154(b) by 628 days.

(21) Appl. No.: 13/363,607

(22) Filed: Feb. 1, 2012

(65) Prior Publication Data

US 2012/0196184 A1 Aug. 2, 2012

(30) Foreign Application Priority Data

Feb. 1, 2011 (JP) ................................ 2011-019466

(51) Int. Cl.
| | |
|---|---|
| *H01M 4/587* | (2010.01) |
| *H01M 4/133* | (2010.01) |
| *H01M 4/134* | (2010.01) |
| *H01M 4/36* | (2006.01) |
| *H01M 4/38* | (2006.01) |
| *H01M 4/62* | (2006.01) |
| *H01M 4/02* | (2006.01) |

(52) U.S. Cl.
CPC ........ *H01M 4/587* (2013.01); *H01M 2004/027* (2013.01); *H01M 4/133* (2013.01); *H01M 4/134* (2013.01); *H01M 4/364* (2013.01); *H01M 4/386* (2013.01); *H01M 4/622* (2013.01); *Y02E 60/122* (2013.01)

(58) Field of Classification Search
CPC ..... H01M 4/587; H01M 4/133; H01M 4/134; H01M 4/364; H01M 4/386; H01M 4/622; H01M 2004/027; Y02E 60/122

USPC ................... 429/231.8, 218.1, 217
See application file for complete search history.

(56) References Cited

U.S. PATENT DOCUMENTS

| | | | |
|---|---|---|---|
| 5,380,606 | A | 1/1995 | Itou et al. |
| 7,736,804 | B2 | 6/2010 | Kim et al. |
| 2009/0246632 | A1 | 10/2009 | Fukui et al. |
| 2010/0273058 | A1 | 10/2010 | Lee et al. |

FOREIGN PATENT DOCUMENTS

| | | |
|---|---|---|
| JP | 5-286763 A | 11/1993 |
| JP | 6-203836 A | 7/1994 |
| JP | 6-275279 A | 9/1994 |
| JP | 2007-087956 A | 4/2007 |
| JP | 2008-027897 A | 2/2008 |
| JP | 2009-238659 A | 10/2009 |
| JP | 2009-535776 A | 10/2009 |
| JP | 2010-212228 A | 9/2010 |

OTHER PUBLICATIONS

Japanese Office Action dated Jul. 1, 2014, issued in corresponding Japanese Patent Application No. 2011-019466 (2 pages).
Office Action dated Feb. 10, 2015, issued in corresponding Japanese Patent Application No. 2011-019466 (2 pages).

*Primary Examiner* — Laura Weiner
(74) *Attorney, Agent, or Firm* — Westerman, Hattori, Daniels & Adrian, LLP

(57) ABSTRACT

Provided is a nonaqueous electrolyte secondary battery in which a negative-electrode active material containing a graphite material and silicon or a silicon compound is used and which has an excellent charge-discharge cycle characteristic. In the nonaqueous electrolyte secondary battery, the negative-electrode active material used is an active material containing a graphite material and silicon or a silicon compound, and the negative electrode binder used comprises a polyimide and polyvinylpyrrolidone.

2 Claims, 1 Drawing Sheet

NONAQUEOUS ELECTROLYTE SECONDARY BATTERY

BACKGROUND OF THE INVENTION

1. Field of the Invention

This invention relates to nonaqueous electrolyte secondary batteries, such as lithium ion secondary batteries.

2. Description of Related Arts

In recent years, nonaqueous electrolyte secondary batteries for performing charge and discharge by using a nonaqueous electrolytic solution to transfer lithium ions between positive and negative electrodes have been used as power sources for portable electronic devices, electric power storage, and others.

In nonaqueous electrolyte secondary batteries of this type, graphite materials are widely used as negative-electrode active materials in their negative electrodes. The use of graphite materials offers the advantage that because they have a flat charge potential and charge and discharge are performed so that lithium ions are inserted into and extracted from between the graphite crystal layers in the negative-electrode active material, the production of acicular metal lithium is reduced, resulting in small volume changes in the negative-electrode active material due to charge and discharge.

Meanwhile, in recent years, higher capacity nonaqueous electrolyte secondary batteries have been demanded in order to meet multifunction and higher performance of portable electronic devices and the like. However, the use of graphite materials as negative-electrode active materials presents a problem in that the theoretical capacity of the intercalation compound, $LiC_6$, is as small as 372 mAh/g and therefore cannot satisfactorily meet the above demand.

To cope with this, it has recently been considered to use as a high-capacity negative-electrode active material a material capable of forming an alloy with lithium ions, such as silicon, tin, or aluminum. Particularly, silicon has a very large theoretical capacity per unit mass of approximately 4200 mAh/g and therefore various studies are being conducted toward its practical use.

However, because the material capable of forming an alloy with lithium ions, such as silicon, greatly changes its volume with storage and release of lithium ions, the expansion and shrinkage of the negative-electrode active material will be great. Thus, there arises a problem in that the electronic conductivity in the negative-electrode active material will be reduced to intermittently decrease the capacity, resulting in a deteriorated charge-discharge cycle characteristic of the nonaqueous electrolyte secondary battery.

To address the above problem, JP-A-H05-286763, JP-A-2007-87956, and JP-A-2008-27897 propose to use as a negative-electrode active material a carbonaceous composite in which a material capable of forming an alloy with lithium ions, such as silicon or aluminum, is supported on the surfaces of carbon particles and the surfaces of the carbon particles are further coated with a carbon material. Also, JP-A-H05-286763, JP-A-2007-87956, and JP-A-2008-27897 describe that the carbon particles absorb volume changes of the material, such as silicon or aluminum, with storage and release of lithium ions to prevent reduction of the electronic conductivity in the negative-electrode active material and improve the charge-discharge cycle characteristic of the nonaqueous electrolyte secondary battery.

Nevertheless, also in the nonaqueous electrolyte secondary batteries described in JP-A-H05-286763, JP-A-2007-87956, and JP-A-2008-27897, the expansion and shrinkage of silicon in the composite during charging and discharging cause reduction in electronic conductivity in the active material and between the active material and the current collector and thereby deteriorate the cycle characteristic.

SUMMARY OF THE INVENTION

An object of the present invention is to provide a nonaqueous electrolyte secondary battery in which a negative-electrode active material containing a graphite material and silicon or a silicon compound is used and which has an excellent charge-discharge cycle characteristic.

The present invention is directed to a nonaqueous electrolyte secondary battery including a negative electrode containing a negative-electrode active material and a negative electrode binder, a positive electrode, and a nonaqueous electrolyte, wherein the negative-electrode active material used is an active material containing a graphite material and silicon or a silicon compound, and the negative electrode binder used comprises a polyimide and polyvinylpyrrolidone.

In the present invention, the adhesion in the negative-electrode active material and the adhesion of the negative-electrode active material layer to the negative-electrode current collector can be increased to improve the charge-discharge cycle characteristic.

The lower limit of the content of polyvinylpyrrolidone in the negative electrode is preferably more than 0 parts by mass per 100 parts by mass of a total of the negative-electrode active material and the negative electrode binder, and more preferably not less than 0.3 parts by mass. On the other hand, the upper limit of the content of polyvinylpyrrolidone in the negative electrode is preferably not more than 1 part by mass per 100 parts by mass of a total of the negative-electrode active material and the negative electrode binder, and more preferably not more than 0.9 parts by mass. If the content of polyvinylpyrrolidone is too small, the property of a slurry for forming the negative-electrode active material layer containing the negative-electrode active material and the negative electrode binder will be degraded, which may make it difficult to produce a negative electrode and decrease the adhesion. On the other hand, if the content of polyvinylpyrrolidone is too large, the content of polyimide will be relatively small, which may decrease the adhesion of the negative-electrode active material layer to the negative-electrode current collector to fail to sufficiently improve the charge-discharge cycle characteristic.

The lower limit of the content of polyvinylpyrrolidone (PVP) in the negative electrode binder is preferably not less than 5.0 parts by mass per 100 parts by mass of a total of PVP and polyimide (PI), more preferably not less than 10.0 parts by mass, and still more preferably not less than 20.0 parts by mass. The upper limit of the content of PVP in the negative electrode binder is preferably not more than 50 parts by mass per 100 parts by mass of a total of PVP and PI, more preferably not more than 45.0 parts by mass, and still more preferably not more than 30.0 parts by mass. If the content of PVP is small, the property of a slurry for forming the negative-electrode active material layer will be degraded as described previously, so that a satisfactory adhesion may not be achieved. On the other hand, if the content of PVP is too large, the relative content of PI will be small, which may decrease the adhesion of the negative-electrode active material layer to the negative-electrode current collector to fail to sufficiently improve the charge-discharge cycle characteristic.

The lower limit of the content of negative electrode binder in the negative electrode is preferably not less than 1.0 part by mass per 100 parts by mass of the negative-electrode active material, and more preferably not less than 2.0 parts by mass. On the other hand, the upper limit of the content of negative electrode binder in the negative electrode is preferably not more than 10.0 parts by mass per 100 parts by mass of the negative-electrode active material, and more preferably not more than 5.0 parts by mass. If the content of negative electrode binder is too small, the adhesion of the negative-electrode active material layer to the negative-electrode current collector may be decreased, so that the negative-electrode active material layer may shed from the negative-electrode current collector. On the other hand, if the content of negative electrode binder is too large, the binder will prevent the charging/discharging reaction to make it difficult to provide the effect due to the negative-electrode active material layer containing silicon having a large theoretical capacity per unit volume.

The negative-electrode active material contains a graphite material and silicon or a silicon compound. Examples of such an active material include mixtures in which a graphite material and silicon or a silicon compound are mixed, composites in which silicon or a silicon compound is supported on the particle surface of a graphite material, and composites in which a graphite material is supported on the particle surface of silicon or a silicon compound.

Examples of the graphite material include artificial graphite and natural graphite.

Examples of silicon include polycrystalline silicon and amorphous silicon.

Examples of the silicon compound include $SiO$ and $SiO_2$.

The lower limit of the content of silicon or silicon compound in the negative-electrode active material formed by containing the graphite material and silicon or the silicon compound is preferably not less than 3.0 parts by mass per 100 parts by mass of the negative-electrode active material, and more preferably not less than 5.0 parts by mass. On the other hand, the upper limit of the content of silicon or silicon compound in the negative-electrode active material formed by containing the graphite material and silicon or the silicon compound is preferably not more than 20.0 parts by mass per 100 parts by mass of the negative-electrode active material, and more preferably not more than 15.0 parts by mass. If the content of silicon or silicon compound is too small, the effect of increasing the battery capacity, which is the effect expected by using silicon or a silicon alloy as a negative-electrode active material, will be less likely to be achieved. On the other hand, if the content of silicon or silicon compound is too large, it can be considered that the influence of volume changes of silicon will be increased.

No particular limitation is placed on the type of positive-electrode active material for use so long as it can store and release lithium and has a noble potential. For example, lithium-transition metal composite oxides having a layered structure, a spinel structure, or an olivine structure can be used as positive-electrode active materials. Of these, the preferred are lithium-transition metal composite oxides having a layered structure because of their high energy density. Examples of such lithium-transition metal composite oxides include lithium-nickel composite oxides, lithium-nickel-cobalt composite oxides, lithium-nickel-cobalt-aluminum composite oxides, lithium-nickel-cobalt-manganese composite oxides, and lithium-cobalt composite oxides.

Examples of the binder for use in the positive electrode include fluorocarbon resins having vinylidene fluoride units, such as poly(vinylidene fluoride) (PVDF) and modified products of PVDF.

Examples of the solvent for the nonaqueous electrolyte that can be used are solvents conventionally used for nonaqueous electrolyte secondary batteries. Of these, the particularly preferred is a mixture solvent of a cyclic carbonate and a chain carbonate. More specifically, the mixture ratio between the cyclic carbonate and the chain carbonate ((cyclic carbonate):(chain carbonate)) is preferably within the range of 1:9 to 5:5.

Examples of the cyclic carbonate include ethylene carbonate, fluoroethylene carbonate, propylene carbonate, butylene carbonate, vinylene carbonate, and vinyl ethylene carbonate. Examples of the chain carbonate include dimethyl carbonate, methyl ethyl carbonate, and diethyl carbonate.

Examples of the solute for the nonaqueous electrolyte include $LiPF_6$, $LiBF_4$, $LiCF_3SO_3$, $LiN(SO_2F)_2$, $LiN(SO_2CF_3)_2$, $LiN(SO_2C_2F_5)_2$, $LiC(SO_2CF_3)_3$, $LiC(SO_2C_2F_5)_3$, $LiClO_4$, and their mixtures.

Furthermore, possible electrolytes for use include gel polymer electrolytes in which a polymer, such as polyethylene oxide or polyacrylonitrile, is impregnated with an electrolytic solution.

The present invention can provide a nonaqueous electrolyte secondary battery in which a negative-electrode active material containing a graphite material and silicon or a silicon compound is used and which has an excellent charge-discharge cycle characteristic.

DETAILED DESCRIPTION

Example 1

Preparation of Silicon Active Material

Figure 1:
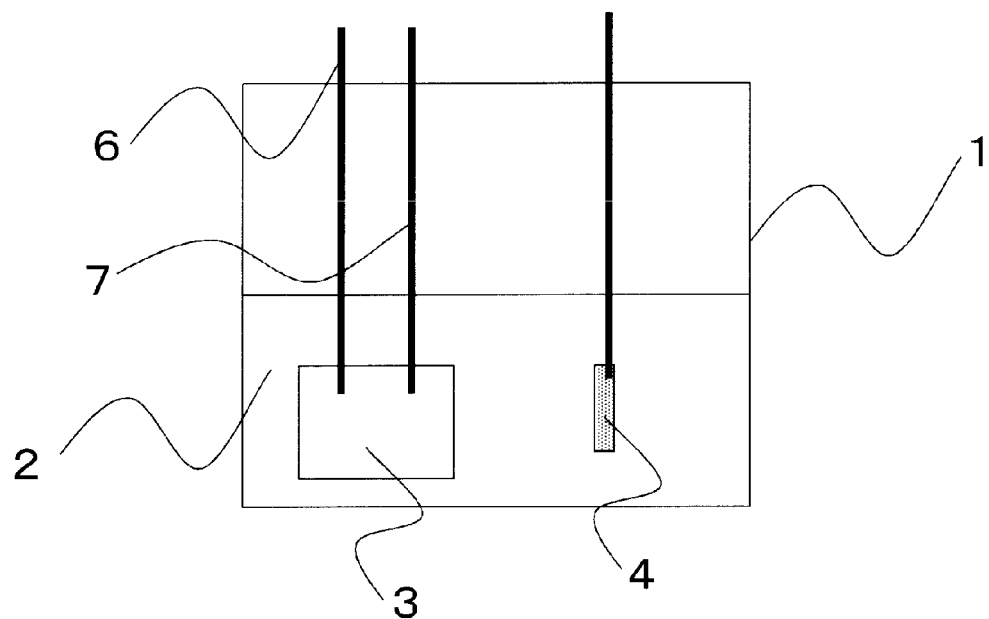
FIG. 1 is a schematic diagram illustrating the principle of a three-electrode test cell used in Examples.

First, a polycrystalline silicon mass was prepared by thermal reduction. Specifically, a silicon core placed in a metallic reaction furnace (reduction furnace) was heated by the passage of electric current therethrough to increase its temperature to 800° C. and in this state exposed to a stream of a mixed gas of a vapor of purified high-purity monosilane ($SiH_4$) gas and purified hydrogen to deposit polycrystalline silicon on the surface of the silicon core. Thus, a polycrystalline silicon mass in the form of a thick rod was prepared.

Next, this polycrystalline silicon mass was ground and classified to prepare polycrystalline silicon particles (a silicon active material) with a purity of 99%. The prepared polycrystalline silicon particles had a crystallite size of 32 nm and a median diameter of 10 μm. The crystallite size was calculated from the Scherrer equation using the peak half-width of the silicon (111) plane obtained by powder X-ray diffractometry. The median diameter was defined as a diameter at 50% cumulative volume in a particle size distribution measurement made by laser diffractometry.

[Preparation of Negative-Electrode Mixture Slurry]

A negative electrode binder used was a thermoplastic polyimide resin precursor that has a molecular structure represented by Formula 1 below (where n represents an integer of 1 or more) and has s glass transition temperature of 300° C. This polyimide resin precursor can be made from a 3,3',4,4'-benzophenonetetracarboxylic acid diethyl ester represented by Formula 2, 3, or 4 below and m-phenylenediamine represented by Formula 5 below. In Formulae 2 to 4, R' represents a hydrogen atom or a monovalent organic group.

Furthermore, 3,3',4,4'-benzophenonetetracarboxylic acid diethyl esters represented by Formulae 2, 3, and 4 below can be prepared by reacting 3,3',4,4'-benzophenonetetracarboxylic dianhydride represented by Formula 6 below with 2 equivalent of ethanol in the presence of N-methyl-2-pyrrolidone (NMP).

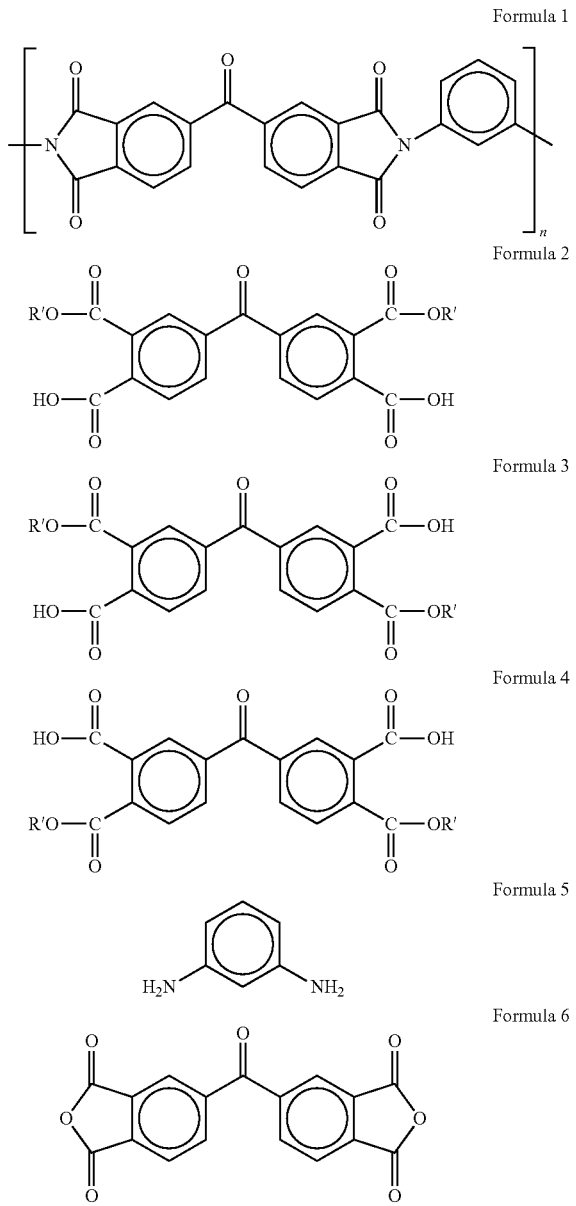

Formula 1

Formula 2

Formula 3

Formula 4

Formula 5

Formula 6

A varnish (47% by mass) obtained by dissolving the polyimide resin precursor in NMP, polyvinylpyrrolidone, graphite, and the above silicon active material were mixed in NMP to give a mass ratio of graphite to silicon active material to polyimide resin to polyvinylpyrrolidone of 90.0:7.0:2.4:0.6. Thus, a negative-electrode mixture slurry was prepared. The polyimide resin precursor was mixed so that the mass thereof after being imidized was given the above content.

[Production of Negative Electrode]

The above negative-electrode mixture slurry was applied onto both sides of a piece of copper foil serving as a negative-electrode current collector, dried, rolled and then subjected to a heat treatment in an argon atmosphere at 400° C. for 10 hours to produce a negative electrode. Note that through the heat treatment, the polyimide resin precursor was imidized into a polyimide resin. The packing density of the negative-electrode active material layer was 1.60 g/cm$^3$.

Example 2

A negative electrode was produced in the same manner as in Example 1, except that graphite, the silicon active material, the polyimide resin, and polyvinylpyrrolidone were mixed to give a mass ratio of 90.0:7.0:2.7:0.3.

Example 3

A negative electrode was produced in the same manner as in Example 1, except that graphite, the silicon active material, the polyimide resin, and polyvinylpyrrolidone were mixed to give a mass ratio of 90.0:7.0:2.1:0.9.

Comparative Example 1

The negative electrode binder used was composed of carboxymethyl cellulose (CMC) and styrene-butadiene rubber (SBR). A negative electrode was produced in the same manner as in Example 1, except that graphite, the silicon active material, CMC, and SBR were mixed to give a mass ratio of 90.9:7.1:1.0:1.0 and water was used as a dispersion medium in place of NMP.

Comparative Example 2

A negative electrode was produced in the same manner as in Example 1, except that polyacrylonitrile (PAN) was used as the negative electrode binder and graphite, the silicon active material, and PAN were mixed to give a mass ratio of 90.0:7.0:3.0.

Comparative Example 3

A negative electrode was produced in the same manner as in Example 1, except that poly(vinylidene fluoride) (PVDF) was used as the negative electrode binder and graphite, the silicon active material, and PVDF were mixed to give a mass ratio of 90.0:7.0:3.0.

Comparative Example 4

A negative-electrode mixture slurry was prepared in the same manner as in Example 1, except that the polyimide resin (PI) was solely used as the negative electrode binder and graphite, the silicon active material, and PI were mixed to give a mass ratio of 90.0:7.0:3.0. However, the resultant negative-electrode mixture slurry had such a poor slurry property that it did not allow the negative-electrode active material to be dispersed therein, so that it could not be applied on the negative-electrode current collector.

Comparative Example 5

A negative-electrode mixture slurry was prepared by using polyvinylpyrrolidone (PVP) only as the negative electrode binder and mixing graphite, the silicon active material, and PVP to give a mass ratio of 90.0:7.0:3.0. However, the resultant negative-electrode mixture slurry had such a poor slurry property that it did not allow the negative-electrode active material to be dispersed therein, so that it could not be applied on the negative-electrode current collector.

[Evaluation of Adhesion]

The electrodes obtained in the above Examples 1 to 3 and Comparative Examples 1 to 3 were evaluated in terms of adhesion. Specifically, the adhesion strength between the current collector and the active material layer of each electrode was evaluated by a 90° peel test method in the following manner.

More specifically, each negative electrode was attached onto a 120 mm by 30 mm acrylic plate through a 70 mm by 20 mm adhesive double-faced tape (trade name "NAISTAK® NW-20" manufactured by Nichiban Co., Ltd.). An end of the negative electrode attached to the acrylic plate was pulled 55 mm upward from and at a right angle with the surface of the negative-electrode active material layer at a constant rate (50 mm/min) by a small desktop testing machine ("FGS-TV" and "FGP-5" manufactured by Nidec-Shimpo Corporation), thereby measuring the peeling strength upon peel-off. The measurement of the peeling strength was conducted three times, and the average value of the three measurement results was determined as a 90° peeling strength. In TABLE 1, the relative values of the determined 90° peeling strengths with respect to that of Comparative Example 1 assigned 100 are indicated as "Adhesion".

[Production of Three-Electrode Test Cell]

Three-electrode test cells were produced using respective negative electrodes of Examples 1 to 3 and Comparative Examples 1 to 3.

Figure 2:
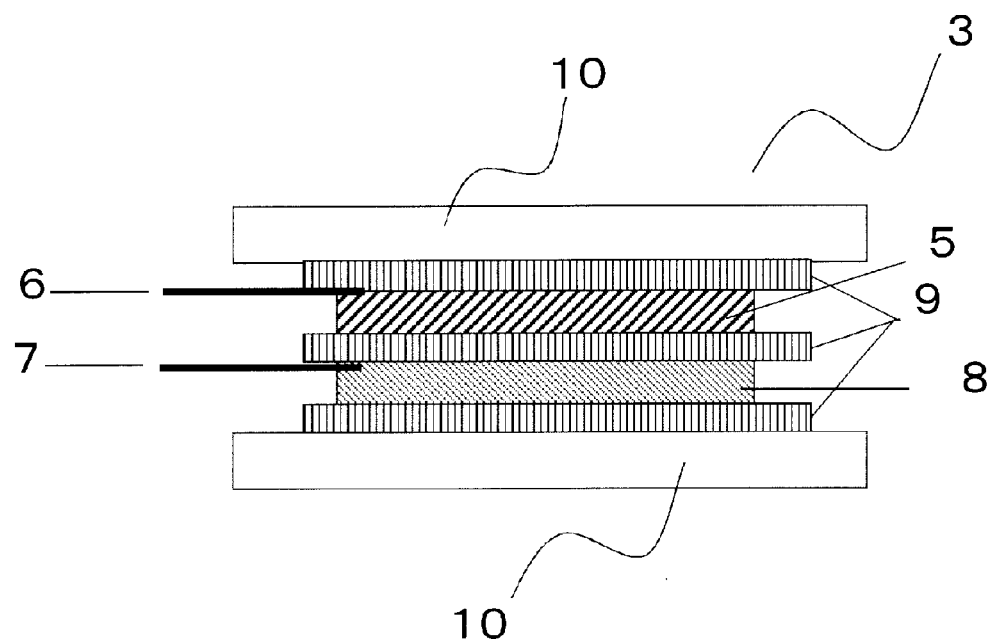
FIG. 2 is a schematic illustration of an electrode assembly of the three-electrode test cell used in Examples.

FIG. 1 is a schematic diagram schematically illustrating the principle of the three-electrode test cells. FIG. 2 is a schematic illustration of an electrode assembly. As shown in these figures, an electrolytic solution 2 is put into a container 1 and an electrode assembly 3 and a reference electrode 4 are disposed in contact with the electrolytic solution 2.

First, a 0.05 mm thick, 4 mm wide nickel tab 6 was attached to a negative electrode 5 by overlapping the tab and the negative electrode, punching them with a pin, and upsetting or swaging the pin. A 25 mm by 25 mm by 04 mm lithium metal plate having a tab 7 attached thereto was used as a counter electrode 8. The tabbed negative electrode 5 and the tabbed counter electrode 8 were overlaid with a porous polypropylene membrane 9 interposed therebetween, these components were sandwiched between two glass sheets 10, and the sandwich was clipped to form an electrode assembly.

A lithium metal plate was used as the reference electrode 4.

The reference electrode 4 and the electrode assembly 3 were disposed in the container (glass cell) 1. Then, the electrolytic solution 2 was poured into the container 1 and the container 1 was sealed to produce a three-electrode test cell. The tabs of the negative and counter electrodes and the reference electrode were secured to clips providing an external electrical connection. The electrolytic solution used was a solution obtained by mixing ethylene carbonate and diethyl carbonate in a ratio of 3:7 and dissolving, into the resultant mixture solvent, lithium hexafluorophosphate in a concentration of 1 mol/L.

[Evaluation of Charge-Discharge Characteristic]

Each three-electrode test cell was subjected to a charge-discharge test in the following manner to evaluate it in terms of charge-discharge cycle characteristic. Specifically, the three-electrode test cell was first charged at a constant current with a current density of 1.0 mA/cm$^2$ to 0 V, then charged at a constant current with a current density of 0.1 mA/cm$^2$ while held at 0 V, and then discharged at a constant current with a current density of 1.0 mA/cm$^2$ to 1 V.

Under the condition that the above first and second constant-current charging operations and the constant-current discharging operation constitute a single cycle of charging and discharging, the test cell was subjected to 50 cycles of charging and discharging and measured in terms of first and 50th cycle capacities. In this test, the potential at which lithium is converted into lithium ions is assumed to be 0 V.

The capacity retentions (%) of the 50th cycle capacity to the first cycle capacity in Examples 1 to 3 and Comparative Examples 1 to 3 are shown as respective cycle characteristics in TABLE 1.

TABLE 1

|  | Binder | Slurry Property | Adhesion | Cycle Characteristic |
|---|---|---|---|---|
| Ex. 1 | PI/PVP (2.4/0.6) | ○ | 215 | 98 |
| Ex. 2 | PI/PVP (2.7/0.3) | ○ | 195 | 96 |
| Ex. 3 | PI/PVP (2.1/0.9) | ○ | 190 | 96 |
| Comp. Ex. 1 | CMC/SBR | ○ | 100 | 91 |
| Comp. Ex. 2 | PAN | ○ | 185 | 94 |
| Comp. Ex. 3 | PVDF | ○ | 145 | 93 |
| Comp. Ex. 4 | PI | X | — | — |
| Comp. Ex. 5 | PVP | X | — | — |

As can be seen from Table 1, of the above nonaqueous electrolyte secondary batteries in which a mixture of graphite and a silicon active material was used as a negative-electrode active material, Comparative Example 4 employing a polyimide (PI) only as a binder and Comparative Example 5 employing polyvinylpyrrolidone (PVP) only as a binder exhibited such poor slurry properties that their slurries could not be applied to current collectors, resulting in failure in the production of negative electrodes.

Comparative Example 1 employing an aqueous negative-electrode mixture slurry containing CMC and SBR as binders exhibited a poor adhesion of the negative-electrode mixture layer to the negative-electrode current collector, resulting in a poor cycle characteristic.

Comparative Example 2 employing polyacrylonitrile (PAN) as a binder and Comparative Example 3 employing poly(vinylidene fluoride) (PVDF) as a binder also did not exhibit satisfactory adhesion, resulting in poor cycle characteristics.

In contrast, each of Examples 1 to 3 employing both of a polyimide (PI) and polyvinylpyrrolidone (PVP) as binders exhibited an excellent adhesion in the negative-electrode active material and an excellent adhesion of the negative-electrode active material layer to the negative-electrode current collector, resulting in a good result regarding the charge-discharge cycle characteristic. The improvement in charge-discharge cycle characteristic can be attributed to the fact that the increase in adhesion prevented reduction in electronic conductivity in the active material due to expansion and shrinkage of the active material just after charging and discharging.

Furthermore, as is evident from Examples 1 to 3, an excellent adhesion and an excellent cycle characteristic are obtained when the content of PVP in the negative electrode is within the range of 0.3 to 0.9 parts by mass per 100 parts by mass of a total of the negative-electrode active material and the binders.

Although in the above Examples the negative electrode was evaluated using a three-electrode test cell, the same effects can be achieved also when a lithium-transition metal composite oxide or the like is used as a positive-electrode active material.

What is claimed is:

1. A nonaqueous electrolyte secondary battery including a negative electrode containing a negative-electrode active material and a negative electrode binder, a positive electrode, and a nonaqueous electrolyte, wherein the negative-electrode active material used is an active material containing a graphite material and silicon or a silicon compound, and the negative electrode binder used comprises a polyimide and polyvinylpyrrolidone, wherein the content of polyvinylpyrrolidone is not less than 5.0 parts by mass and not more than 45.0 parts by mass per 100 parts by mass of the total of polyvinylpyrrolidone and the polyimide;

the content of silicon or silicon compound is not less than 3.0 parts by mass and not more than 20.0 parts by mass per 100 parts by mass of a total of the graphite material and silicon or the silicon compound; and the content of polyvinylpyrrolidone in the negative electrode is more than 0 parts by mass and not more than 1 part by mass per 100 parts by mass of a total of the negative-electrode active material and the negative electrode binder.

2. The nonaqueous electrolyte secondary battery according to claim 1, wherein the content of polyvinylpyrrolidone is not less than 5.0 parts by mass and not more than 30.0 parts by mass per 100 parts by mass of the total of polyvinylpyrrolidone and the polyimide.

* * * * *